US011252875B1

(12) United States Patent
Taylor

(10) Patent No.: US 11,252,875 B1
(45) Date of Patent: Feb. 22, 2022

(54) PANELING SYSTEM FOR MOUNTING PLANTERS ON A WALL OR ROOF STRUCTURE

(71) Applicant: Andromeda District Holdings Corp., Coral Gables, FL (US)

(72) Inventor: Jonathan Taylor, Doral, FL (US)

(*) Notice: Subject to any disclaimer, the term of this patent is extended or adjusted under 35 U.S.C. 154(b) by 0 days.

(21) Appl. No.: 17/220,477

(22) Filed: Apr. 1, 2021

(51) Int. Cl.
*A01G 9/02* (2018.01)
*A01G 9/04* (2006.01)

(52) U.S. Cl.
CPC ............ *A01G 9/025* (2013.01); *A01G 9/047* (2013.01)

(58) Field of Classification Search
CPC ........ A01G 9/022; A01G 9/023; A01G 9/024; A01G 9/025; A01G 9/033; A01G 9/02
See application file for complete search history.

(56) References Cited

U.S. PATENT DOCUMENTS

| 4,170,089 | A | * | 10/1979 | Smrt .................... A01G 9/024 47/67 |
| D421,335 | S | * | 3/2000 | Linard ........................... D3/304 |
| D609,275 | S | * | 2/2010 | Lam ............................... D19/86 |
| 8,250,804 | B2 | | 8/2012 | Chang |
| 9,101,212 | B2 | * | 8/2015 | De Roeck .......... A47B 87/0284 |
| 9,468,156 | B2 | | 10/2016 | Sichello |
| D896,522 | S | * | 9/2020 | Noto ............................. D3/304 |
| 2005/0138887 | A1 | * | 6/2005 | Kanachowski ........ B65D 71/70 52/741.1 |
| 2007/0130828 | A1 | * | 6/2007 | Mathy .................... A01G 9/033 47/65.9 |
| 2007/0157514 | A1 | * | 7/2007 | Carpenter ............. A01G 9/033 47/65.9 |
| 2010/0095586 | A1 | * | 4/2010 | Sichello ............. E04F 13/0801 47/65.9 |
| 2011/0113685 | A1 | * | 5/2011 | Chang .................... A01G 9/025 47/39 |
| 2011/0192084 | A1 | * | 8/2011 | MacKenzie ........... A01G 9/025 47/83 |
| 2014/0041298 | A1 | * | 2/2014 | Mack ....................... B62B 1/20 47/66.6 |
| 2014/0115963 | A1 | * | 5/2014 | Sung ...................... A01G 9/025 47/82 |
| 2014/0250782 | A1 | * | 9/2014 | Visser ...................... A01G 9/02 47/65.9 |
| 2015/0313357 | A1 | * | 11/2015 | David ..................... A47B 57/20 211/187 |

(Continued)

*Primary Examiner* — Thanh Pham
(74) *Attorney, Agent, or Firm* — Sanchelima & Associates, P.A.; Christian Sanchelima; Jesus Sanchelima

(57) ABSTRACT

A paneling structure for configuring landscaping designs, living wall designs, and green wall designs. The paneling structure includes a panel structure and a planter structure that is affixed to the panel structure. The planter structure has a container like structure with sidewalls. One of the planter sidewalls include male protrusion members which engage with female members provided as openings along the front face of the panel structure to mount the planter to the panel. The panel structure further includes perimeter side edges being lined with male and female members. The male members of the panel structure engage with the female member of other panel structures to form a wall panel. An irrigation assembly may also be implemented into the paneling structure.

7 Claims, 17 Drawing Sheets

(56) References Cited

U.S. PATENT DOCUMENTS

| | | | |
|---|---|---|---|
| 2016/0050856 A1* | 2/2016 | Shah | A01G 9/025 47/66.1 |
| 2020/0039283 A1* | 2/2020 | Oudendijk | A01G 9/027 |
| 2020/0367453 A1* | 11/2020 | Zhai | A01G 27/00 |
| 2020/0404860 A1* | 12/2020 | Gartland | A01G 27/003 |

* cited by examiner

PANELING SYSTEM FOR MOUNTING PLANTERS ON A WALL OR ROOF STRUCTURE

BACKGROUND OF THE INVENTION

1. Field of the Invention

The present invention relates to a paneling system for planters and, more particularly, to a modular paneling system for mounting planters that includes mounting members that allow for positioning panels vertically along a wall or horizontally on a roof surface.

2. Description of the Related Art

Several designs for a paneling system for planters have been designed in the past. None of them, however, include a modular paneling system that may be implemented in a vertical configuration along a wall or in a horizontal configuration on a roof. A planter assembly with multiple protrusion members is assembled onto a panel assembly to form the modular structure. The planter assembly includes various male protrusion members that allow for the planter to be mounted either horizontally or vertically on the panel. Drainage holes are also implemented onto the planter to remove excess buildup of water. The periphery of the panel structure is fitted with a crenellation pattern to allow for the interlocking of the panels. Further, an irrigation system may be implemented into the system in order to properly maintain the botanical structures inserted within the planters. It is known that there is often a need to beautify an area or building while benefitting the environment. Therefore, there is a need for a paneling system for mounting planters in order to beautify and benefit the environment.

Applicant believes that a related reference corresponds to U.S. Pat. No. 9,468,156 issued for a plant propagation and display tray that is capable of interlocking alignment with at least one other tray and is capable of receiving and holding at least one plant pot. Applicant believes that another related reference corresponds to U.S. Pat. No. 8,250,804 issued for a plant pot holding device that includes one or more panels each having a number of compartments formed with a wider front portion and a narrower rear portion for detachable engaging with plant pots. However, the cited reference differs from the present invention because they fail to disclose a paneling system for planters that allow for a module paneling system with planters that may be mounted in a horizontal or vertical position, thereby allowing the modular panel system to be fitted vertically along a wall or horizontally along a roof.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a paneling system for mounting planters on a wall or roof surface that provides beautification to a surrounding area.

It is another object of this invention to provide a paneling system for mounting planters on a wall or roof surface that provides flexibility to a user by allowing them to mount planters either vertically or horizontally.

It is still another object of the present invention to provide a paneling system for mounting planters on a wall or roof surface that features a paneling assembling with a crenellation periphery to allow for an easily assembled modular panel system.

It is still another object of the present invention to provide a paneling system for mounting planters on a wall or roof surface that features an irrigation assembly to allow for effortless maintenance of the botanical structures implemented into the system.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
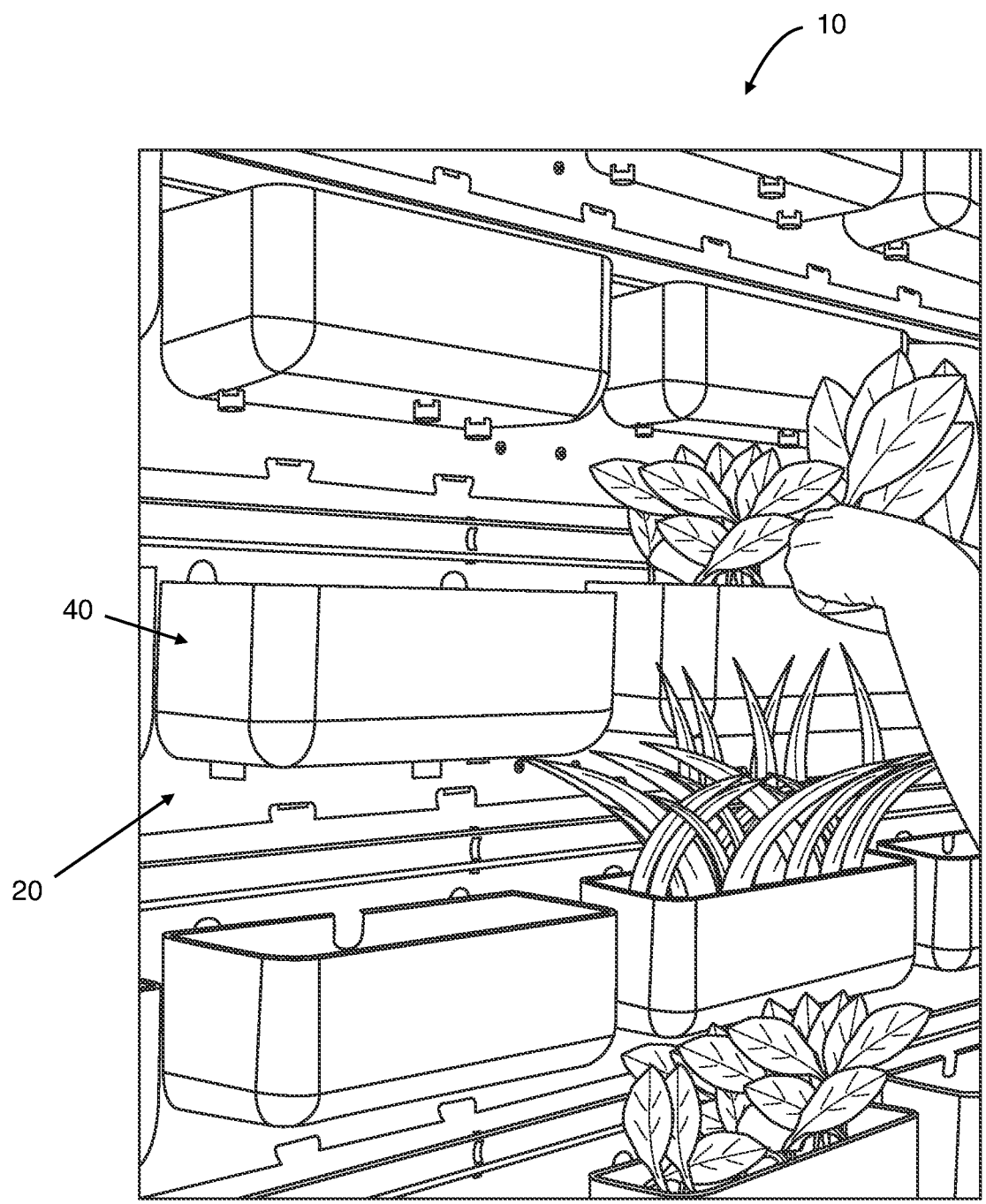
FIG. 1 represents an operational isometric view of the paneling system 10 in an assembled configuration in accordance with an embodiment of the present invention.
Figure 2:
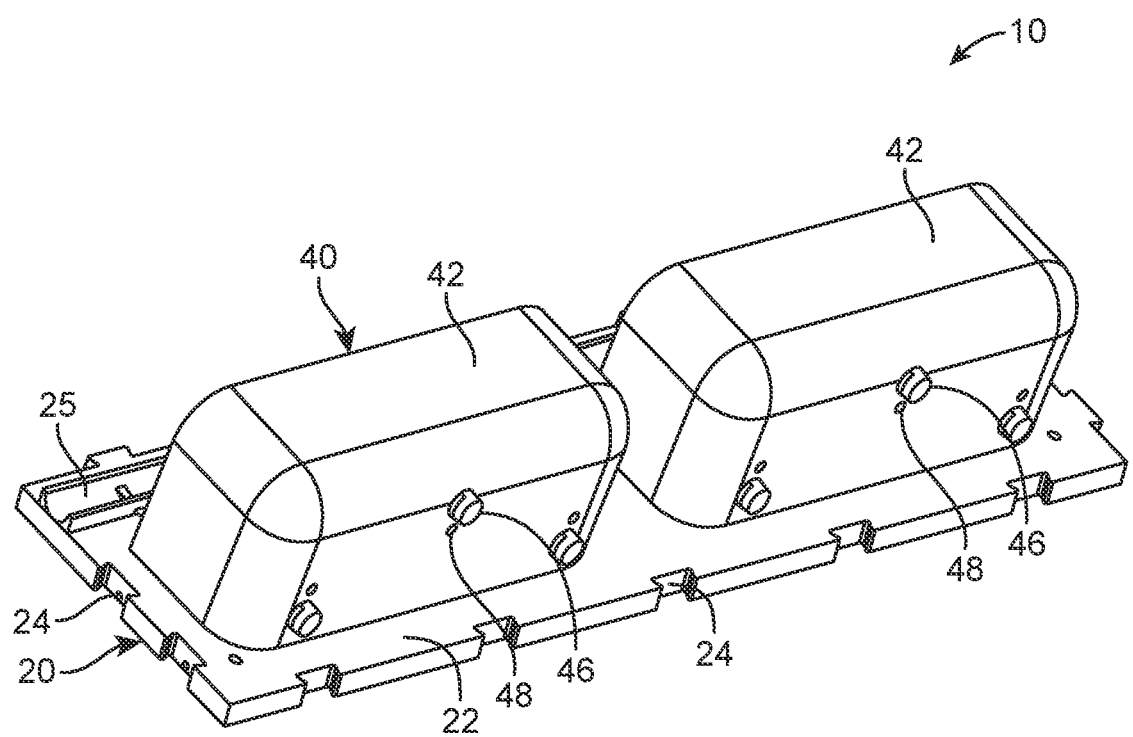
FIG. 2 shows an isometric front view of paneling system 10 depicting the configuration of mounting members 46 of the container assembly 40 being mounted on the panel assembly 20 in accordance with an embodiment of the present invention.
Figure 3:
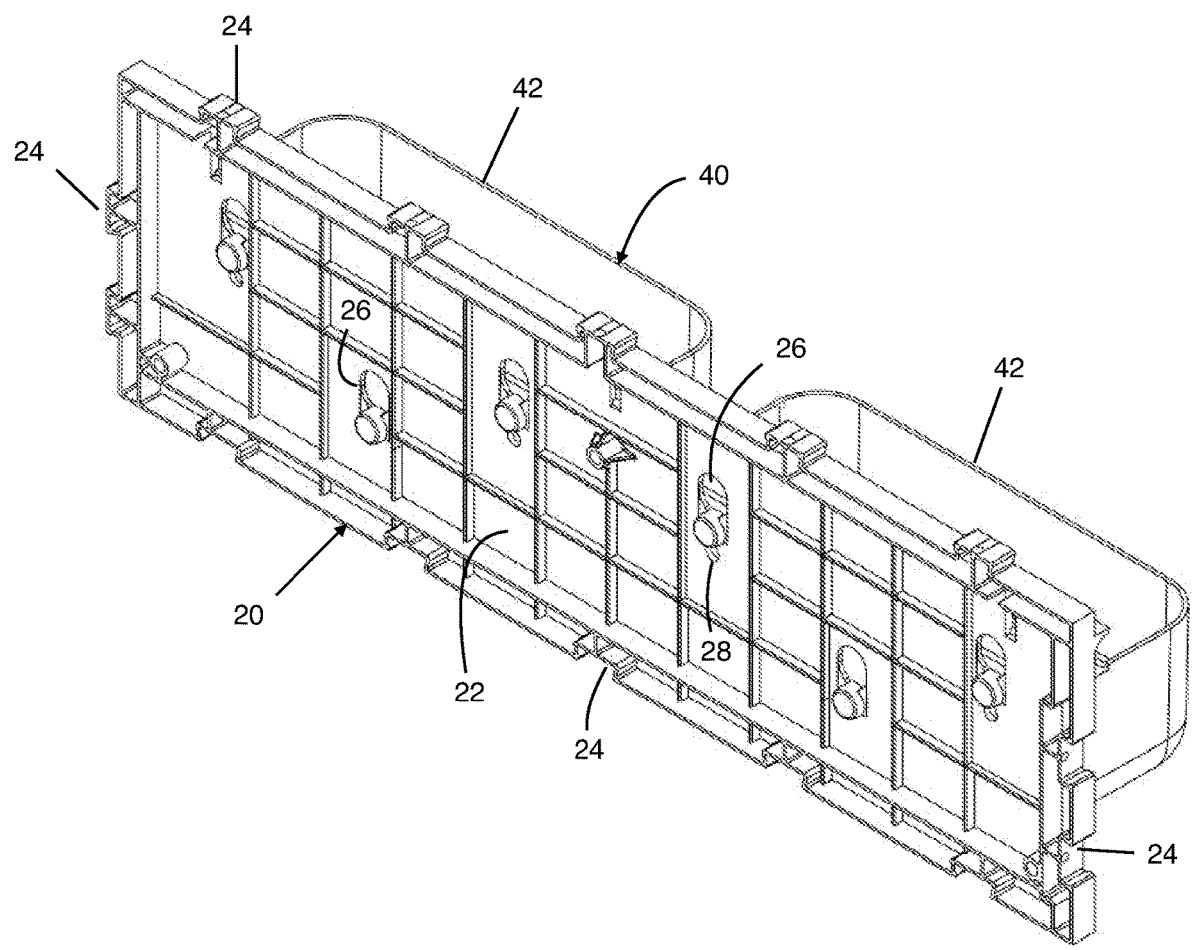
FIG. 3 illustrates an isometric rear view of paneling system 10 depicting mounting members 46 inserted within through holes 26 in accordance with an embodiment of the present invention.
Figure 4:
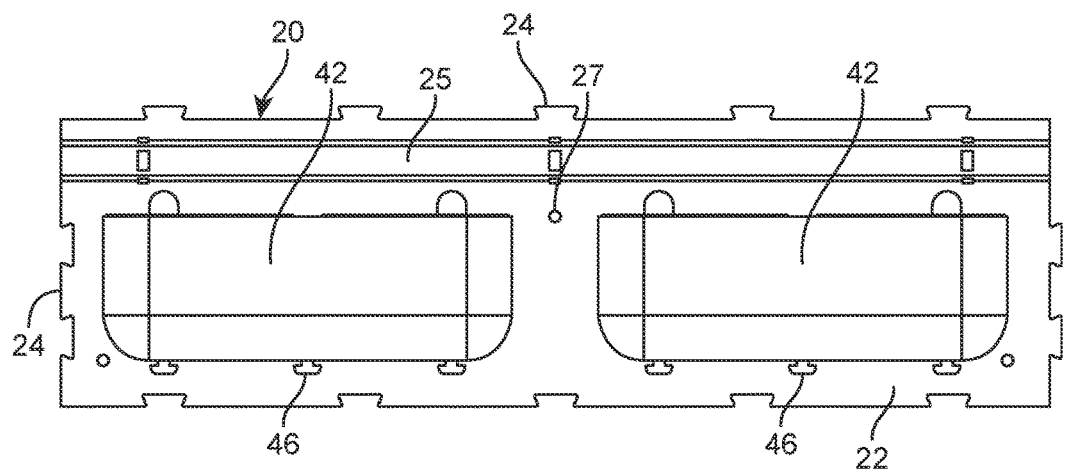
FIG. 4 is a representation an elevational front view of container assembly 40 being mounted to panel assembly 20 in accordance with an embodiment of the present invention.
Figure 5:
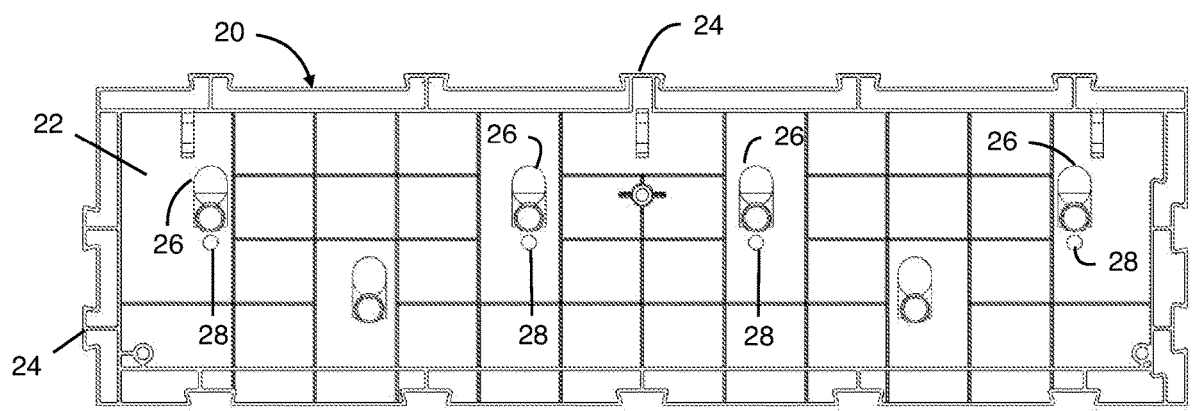
FIG. 5 shows a rear elevational view of panel assembly 20 depicting a configuration of through holes 26 in accordance with an embodiment of the present invention.
Figure 6:
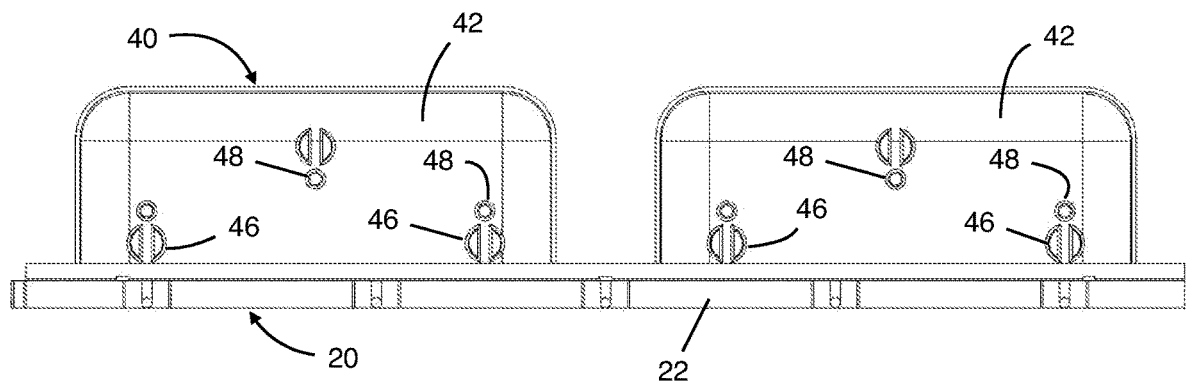
FIG. 6 illustrates bottom plan view of container assembly 40 being mounted onto panel assembly 20 depicting a configuration of mounting members 46 and drainage openings 48 in accordance with an embodiment of the present invention.

Referring now to the drawings, where the present invention is generally referred to with numeral 10, it can be observed a paneling system for mounting planters 10 which basically includes a panel assembly 20, a planter assembly 40, and an irrigation assembly 60.

Panel assembly 20 includes at least one panel 22 which may be observed in FIGS. 2-5 of the provided drawings. In one embodiment, panel 22 may be provided as a substantially rectangular panel having a front side and a rear side. Additionally, the panel further includes a perimeter edge that is lined with a crenellation pattern 24. In the present implementation, crenellation pattern 24 is defined as a series of cut portions and extensions formed into a predetermined pattern along at least one of the perimeter edges of panel 22. It the embodiment observed in the figures, a rectangular crenellation pattern is formed along all four perimeter sides of panel 22. It can be appreciated that other shapes may be used in order to define crenellation pattern 24 such as a triangular or trapezoidal shape. The shape of crenellation pattern 24 is not limited to only being one type of shape. As observed in FIG. 4, a bottom edge of panel 22 may be lined with a series of cut portions of the crenellation pattern 24. Additionally, the top edge of panel 22 is lined with a series of protrusions of crenellation pattern 24. In the present embodiment, panel 22 is configured to be communicably engaged with a corresponding panel 22 in order to form a system of modular panels as it is observed in FIG. 1. The protrusions of the top edge of panel 22 are then communicably received with the cut portions of the bottom edge of a corresponding panel to be locked therewith as also observed in FIG. 1. It should be understood that any number of panels may be interlocked when forming the modular system. Additionally, the modular system of panels may be mounted in a vertical configuration as a wall or in a horizontal configuration as a roof.

In the present embodiment, the front side of panel 22 further includes a channel 25 disposed thereon. Channel 25 may be accurately observed in FIG. 4 of the provided drawings. As observed, channel 25 may be provided as a recessed elongated channel that extends an entire width of panel 22. In the present implementation, channel 25 receives irrigation assembly 60 to be mounted thereon.

Figure 12:
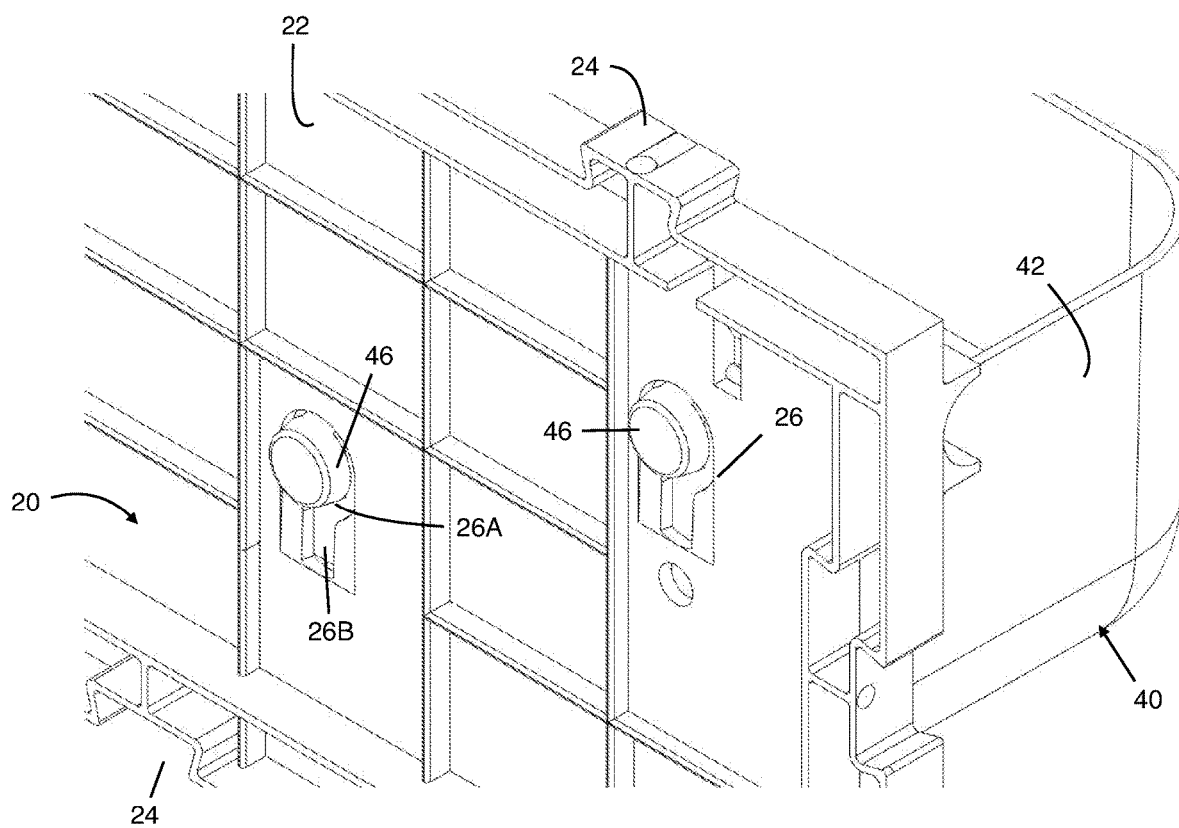
FIG. 12 illustrates an enlarged isometric view of mounting members 46 inserted within through holes 26 in the first locking position in accordance with an embodiment of the present invention.
Figure 13:
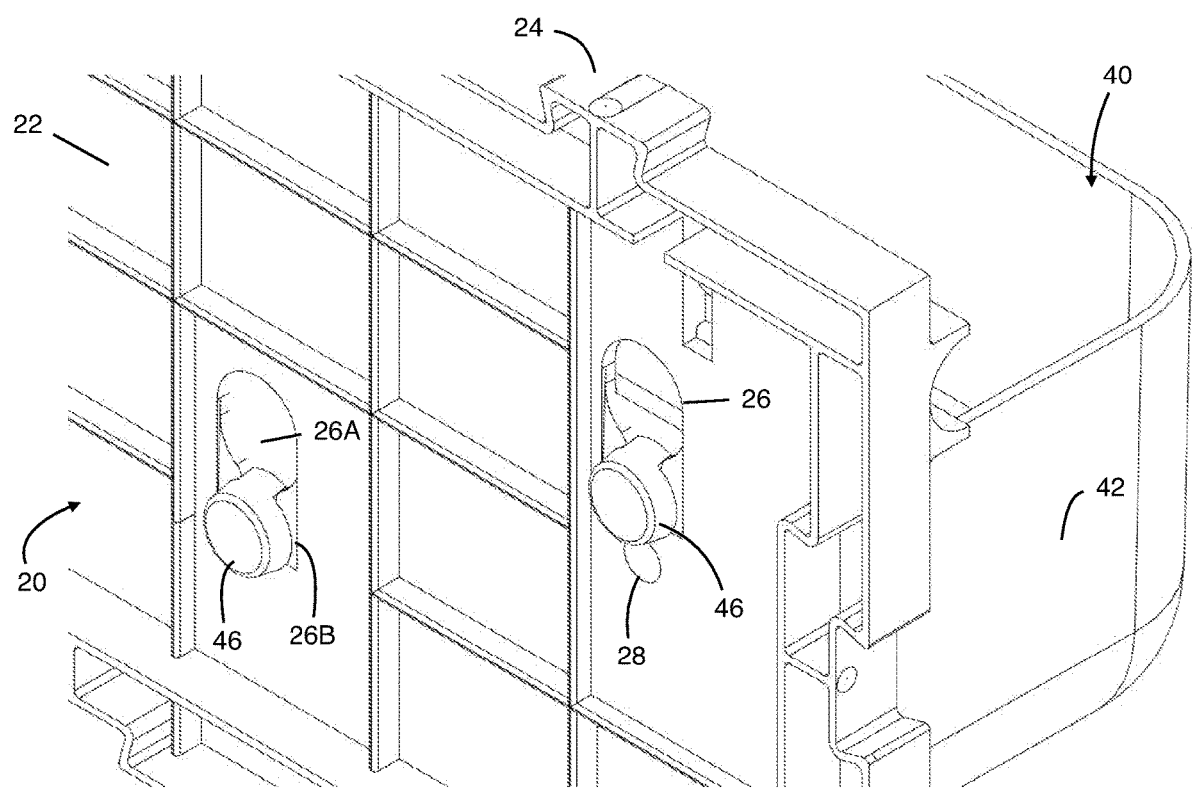
FIG. 13 represents an enlarged isometric view of mounting members 46 inserted within through holes 26 in the second locking position in accordance with an embodiment of the present invention.
Figure 14:
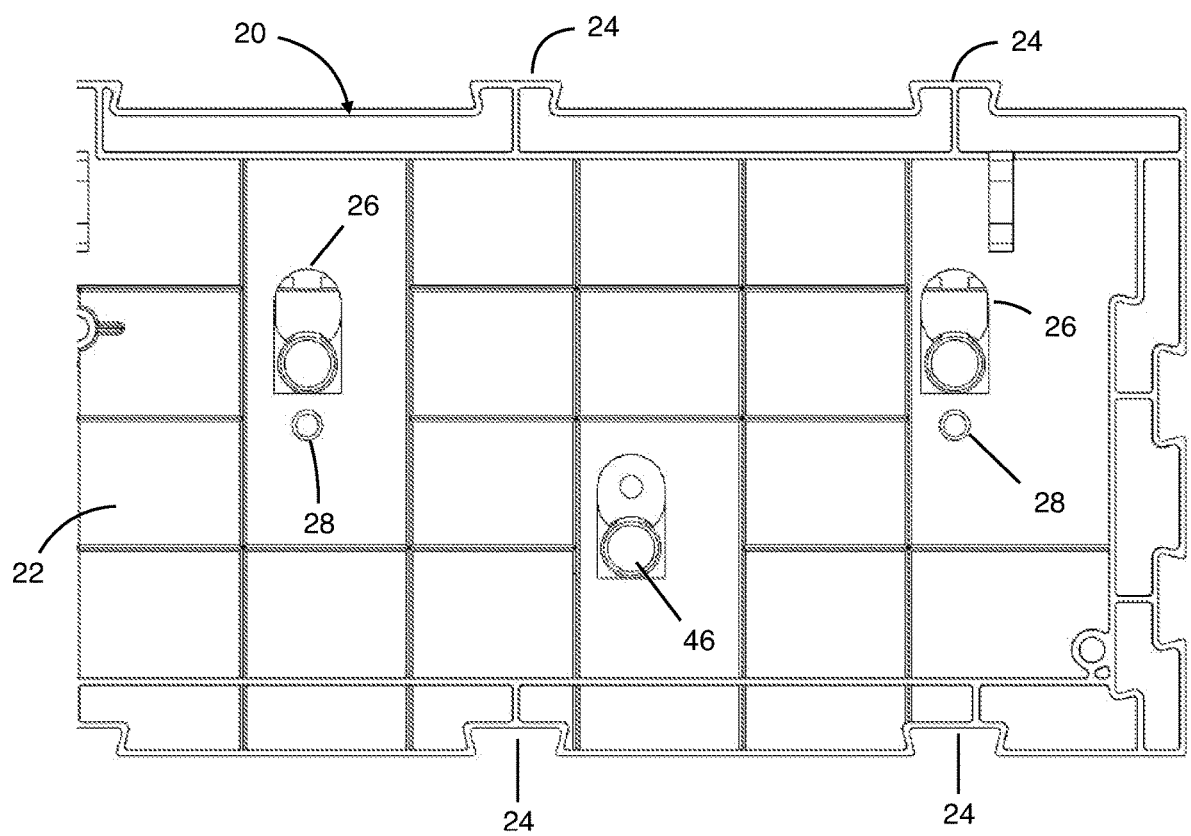
FIG. 14 shows an elevational rear view of panel assembly 20 having mounting members 46 in a locked configuration in accordance with an embodiment of the present invention.

Panel assembly 20 further includes through holes 26 which extend from the front side of the panel 22 to the rear side of the panel 22. An enlarged view of through holes 26 can be properly observed in FIG. 12 of the provided drawings. In one embodiment, through holes 26 comprise of a first section 26A and a second section 26B. As observed in the figure, first section 26A may be provided as a circular opening section which receives mounting members 46 of container assembly 40. The circular portion 46A of mounting members 46 cooperates with the circular opening shape of first section 26A. Additionally, second section 26A may be provided as rectangular opening section which engages with a neck portion 46B of mounting members 46 in order to create a secure mounting engagement. FIG. 13 depicts an operational view with neck portion 46B being engaged with second section 26B.

In the present embodiment, panel 22 further includes a mounting opening 27. Mounting opening 27 may be positioned along a center portion of panel 22 and is used to engage panel 22 with a vertical wall surface. In one implementation, mounting opening 27 operatively receives a fastener therein to be engaged into the wall. Panel 22 further includes drainage openings 28 which are located underneath through holes 26. In the present embodiment, drainage openings 28 align with the drainage holes 48 of container assembly 40. As a result, any runoff liquid that is dispensed from drainage holes 48 may also then be dispensed from drainage openings 28.

Figure 7:
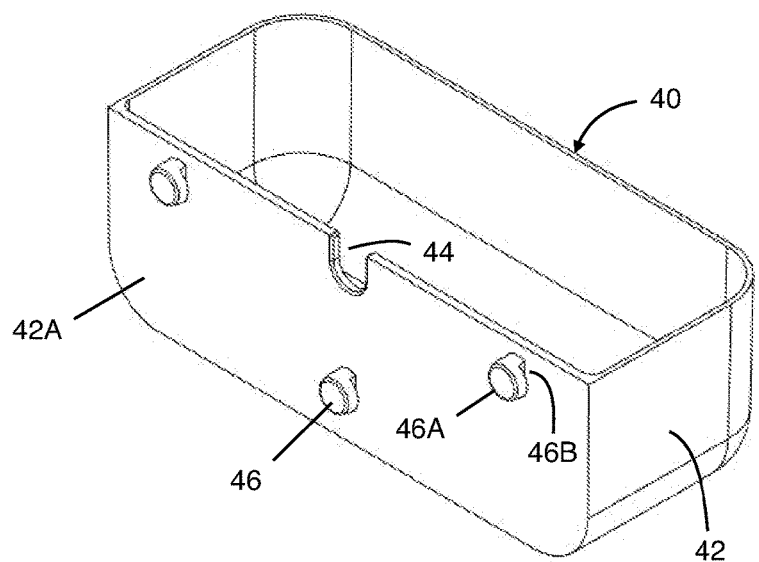
FIG. 7 represents an isometric rear view of container assembly 40 depicting mounting members 46 positioned on a rear surface 42A in accordance with an embodiment of the present invention.
Figure 8:
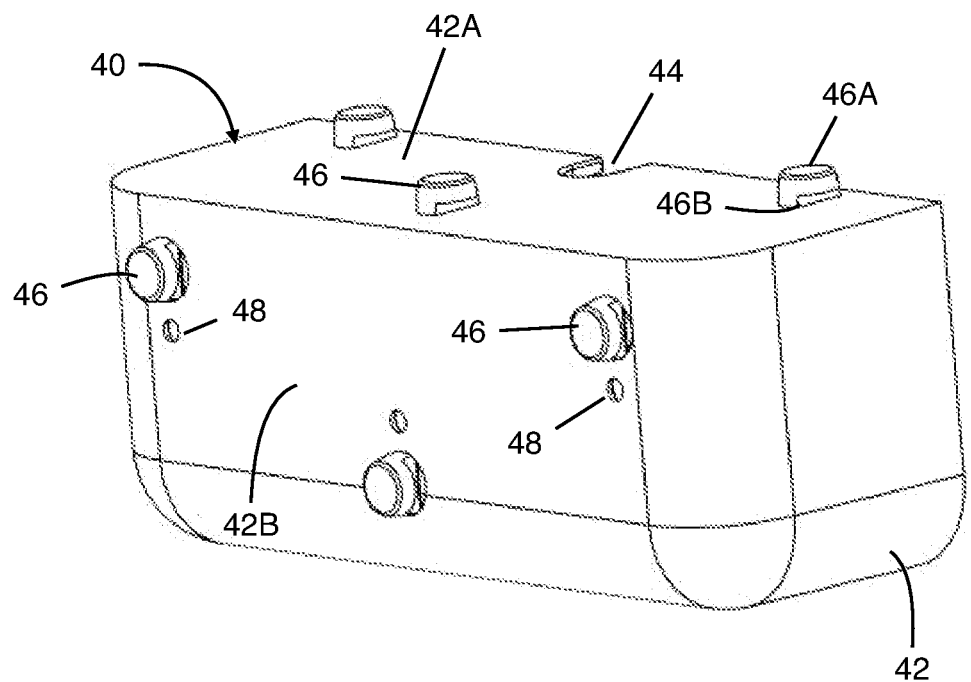
FIG. 8 shows an isometric bottom view of container assembly 40 depicting mounting members 46 positioned on a bottom surface 42B in accordance with an embodiment of the present invention.

Container assembly 40 includes at least one container 42 that is mounted onto the front side of panel 22. FIGS. 7 and 8 accurately depict container 42 in accordance to an embodiment of the present invention. In the present implementation, each of panel 22 is provided with two containers 42. Container 42 further includes a rear surface 42A and a bottom surface 42B. Rear surface 42A comprises an upper top edge which includes a cut section 44. In one embodiment, cut section 44 is provided as a semicircular cut portion that is formed along the upper top edge. It could be appreciated that other shapes may be used for cut section 44. Cut section 44 serves as a mounting point for irrigation assembly 60.

Figure 9:
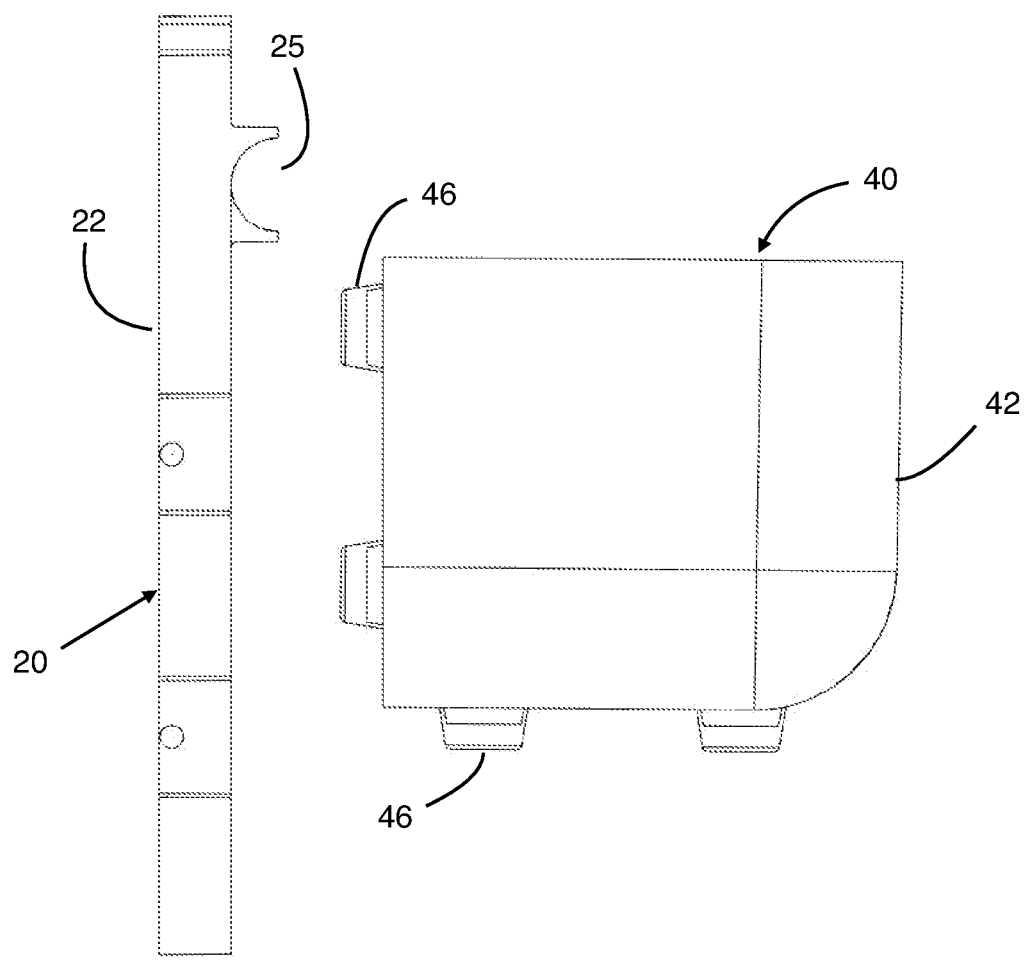
FIG. 9 illustrates an elevational side view depicting container assembly 40 exploded from panel assembly 20 in accordance with an embodiment of the present invention.
Figure 10:
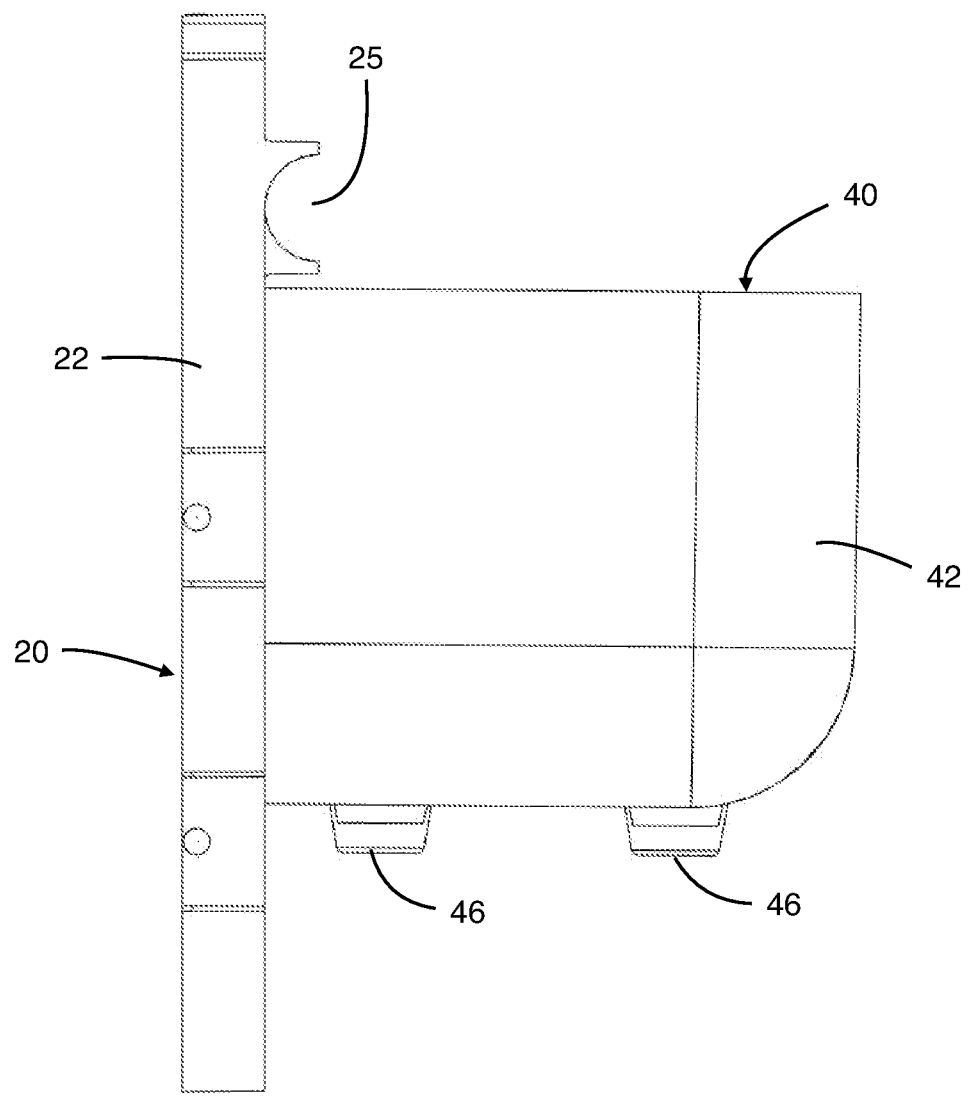
FIG. 10 is a representation of an elevational side view depicting container assembly 40 mounted onto panel assembly 20 in a first locking position in accordance with an embodiment of the present invention.
Figure 11:
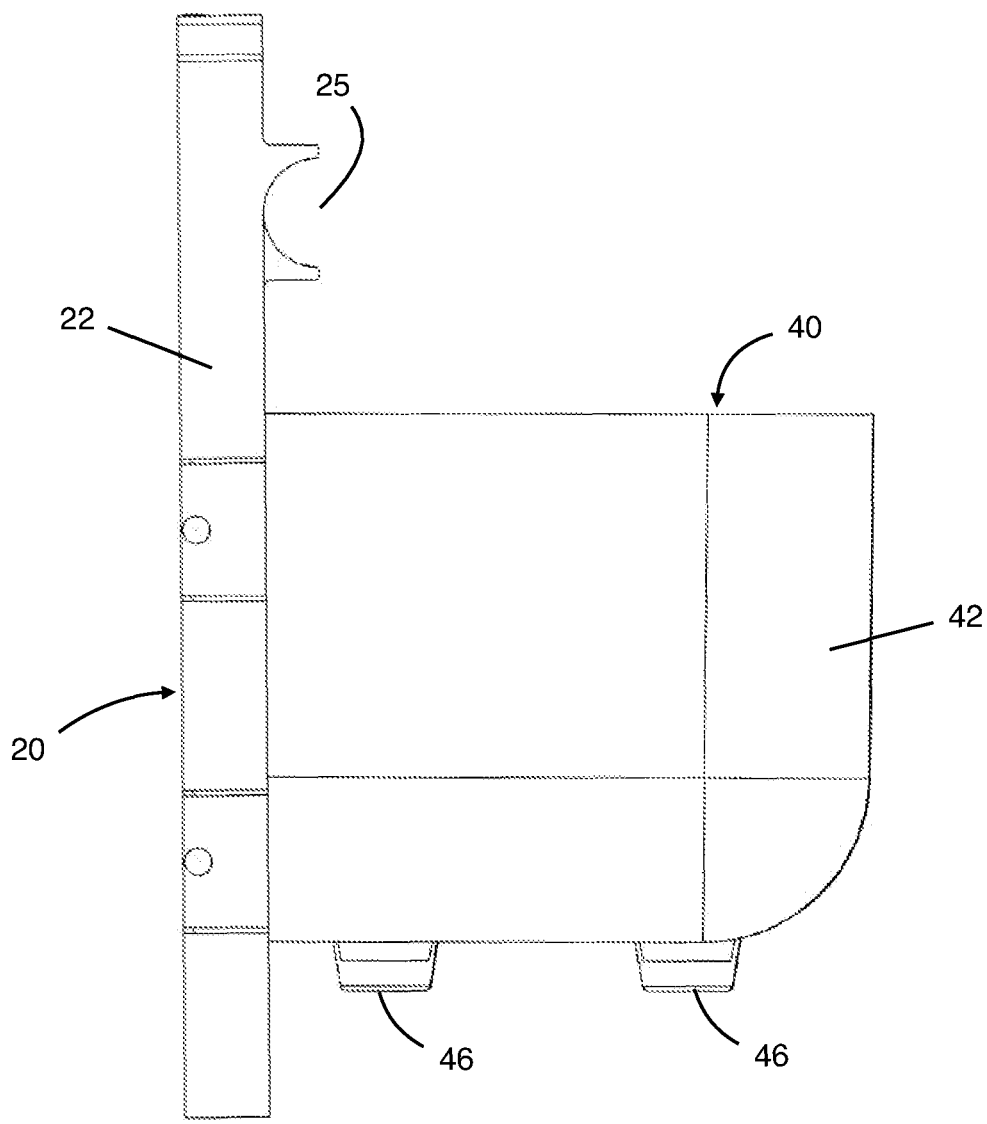
FIG. 11 shows an elevational side view depicting container assembly 40 mounted onto panel assembly 20 in a second locking position in accordance with an embodiment of the present invention.

In the present embodiment, each of rear surface 42A and bottom surface 42B includes mounting members 46 as observed in FIGS. 7 and 8. As previously described, mounting members 46 comprise of a circular portion 46A and a neck portion 46B which cooperates with the shape and size of through hole 26. Circular portion 46A is a circular shaped member that is located in front of neck portion 46B. Neck portion 46B is provided in the shape of a rectangular member that is located between circular portion 46A and rear surface 42A. FIG. 9 depicts an exploded view of container 42 from panel 22 before it is mounted thereon. FIGS. 10 and 12 then depicts a view of mounting members 46 being engaged with through holes 26A. In the depicted mounting position, circular portion 46A is being inserted through the first section 26A of through hole 26. FIGS. 11 and 13 then depicts mounting members 46 locked into through holes 26 as neck portion 46B engages with second section 26B to form locked configuration. In the present embodiment, a downward force is applied to mounting members 46 in order to engage them into a locking position with through holes 26.

Figure 15:
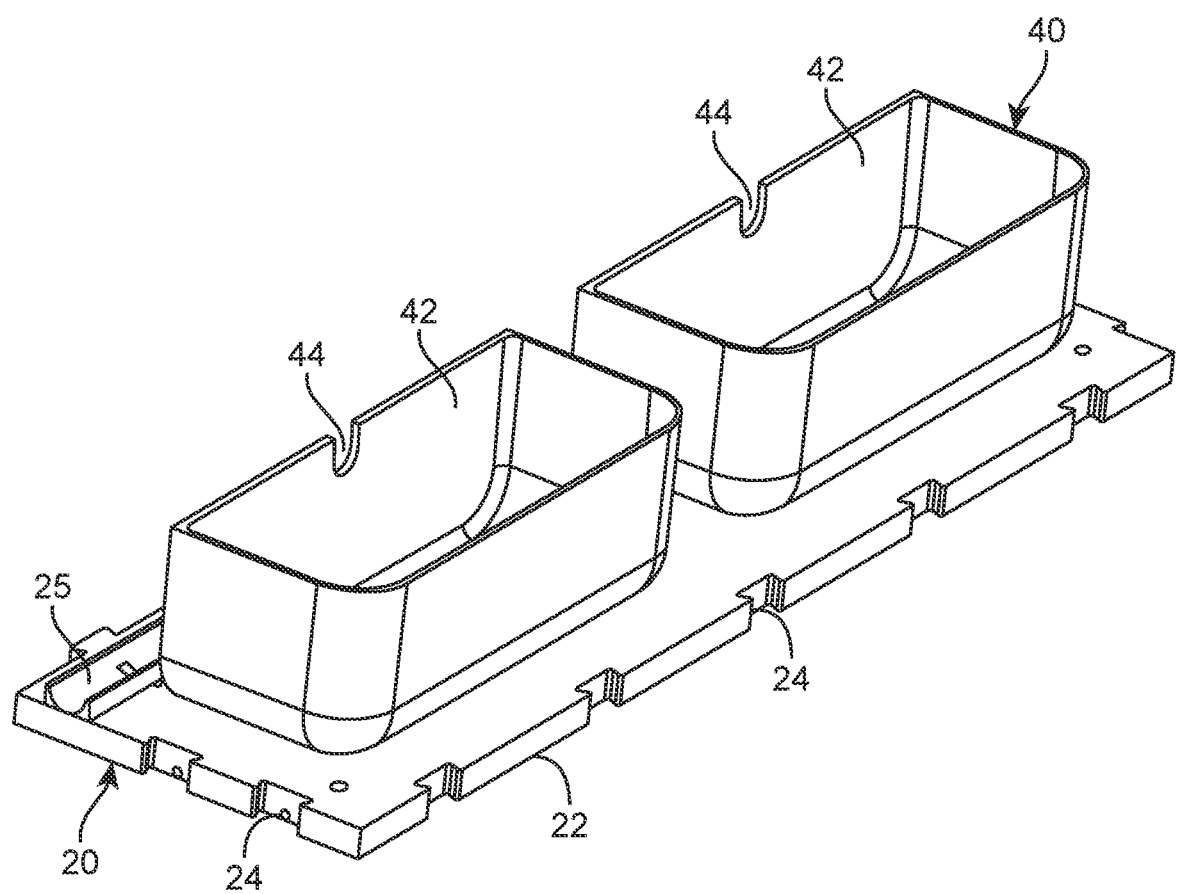
FIG. 15 illustrates an isometric front view of container assembly 40 positioned on panel assembly 20 in an upright configuration in accordance with an embodiment of the present invention.
Figure 16:
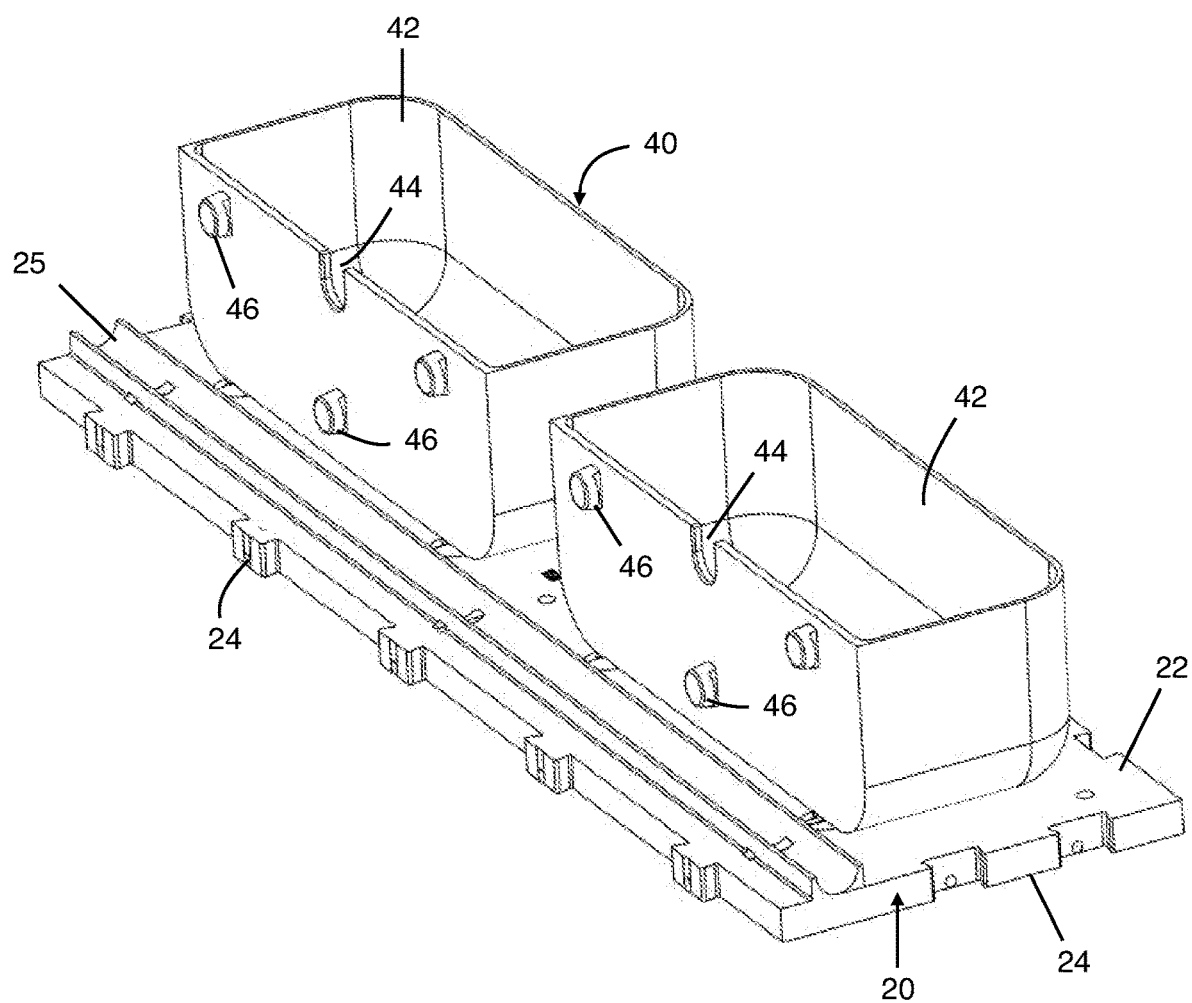
FIG. 16 is a representation of an isometric rear view of container assembly 40 positioned on panel assembly 20 in an upright configuration in accordance with an embodiment of the present invention.
Figure 17:
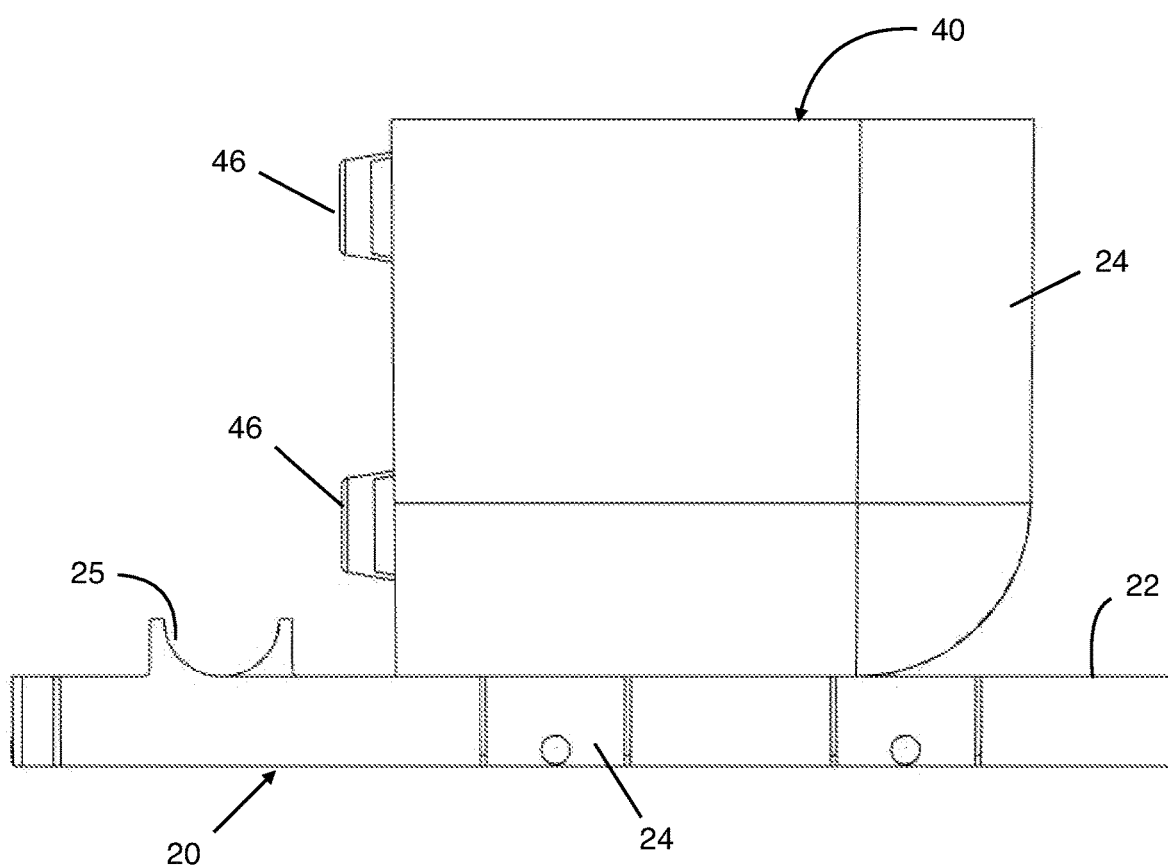
FIG. 17 shows an elevational side view of container assembly 40 positioned on panel assembly 20 in an upright configuration in accordance with an embodiment of the present invention.

As observed in FIGS. 7 and 8, each of rear surface 42A and bottom surface 42B includes mounting members 46. As a result, container 46 may be mounted in a first configuration or a second configuration. The first configuration may be observed in FIG. 2, wherein the rear surface 42A is abuttingly engaged with the front side of panel 22. The first configuration is preferred when configuring the modular system of panels 22 onto a vertical wall configuration as depicted in FIG. 1. The second configuration may be observed in FIG. 15, wherein the bottom surface 42B is abuttingly engaged with the front side of panel 22. The second configuration is preferred when configuration the modular system of panels 22 into a roof configuration a previously described.

In the present embodiment, container 42 further includes drainage holes 48 disposed on bottom surface 42B. Drainage holes 48 are located adjacent to mounting members 46 of bottom surface 42B. The positioning of drainage holes 48 is advantageous as it allows for excess water to be drained out of container 42 regardless of whether it is positioned in the first configuration or the second configuration. When engaged in the first configuration observed in FIGS. 1 and 2, excess water from container 42 is then drained out of drainage holes 48 and drips over a bottom corresponding container. This bottom corresponding container then accumulates the excess water until the water is also drained out of its corresponding drainage holes. This configuration ensures efficiency in the irrigation system and allows for excess water in the system to be efficiently drained out. When engaged in the second configuration observed in FIG. 15, drainage holes 48 then aligns with drainage openings 28 of panel 22. As a result, any excess water to be drained out of container 42 and dispensed from drainage openings 28. The described design advantageously allows for the system to utilize the same design for containers 42 regardless of being in the first configuration or the second configuration.

Figure 18:
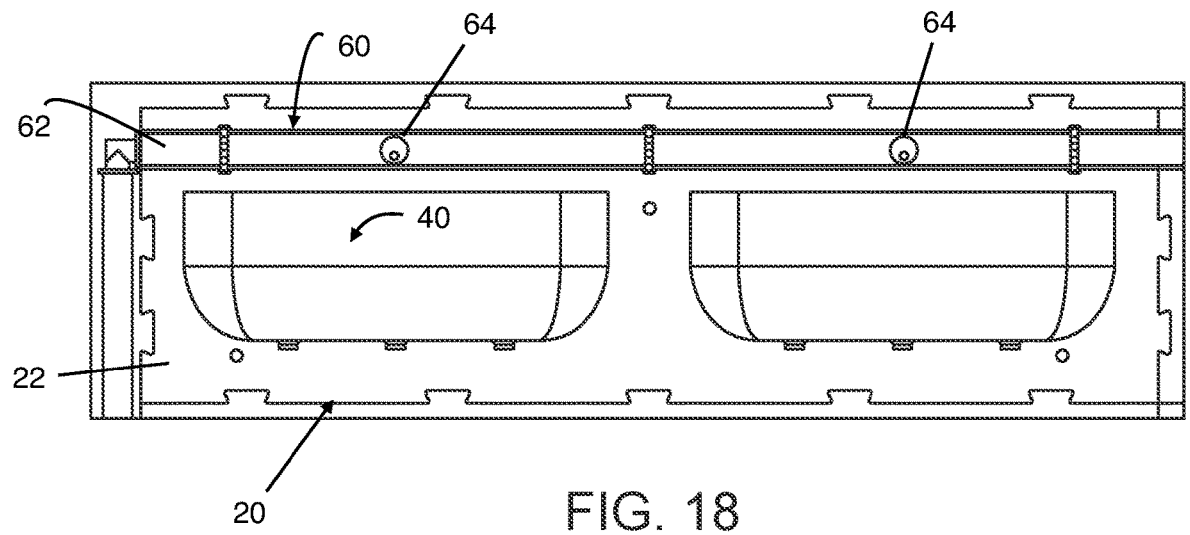
FIG. 18 illustrates an elevational front view depicting irrigation assembly 60 mounted onto panel assembly 20 in accordance with an embodiment of the present invention.
Figure 19:
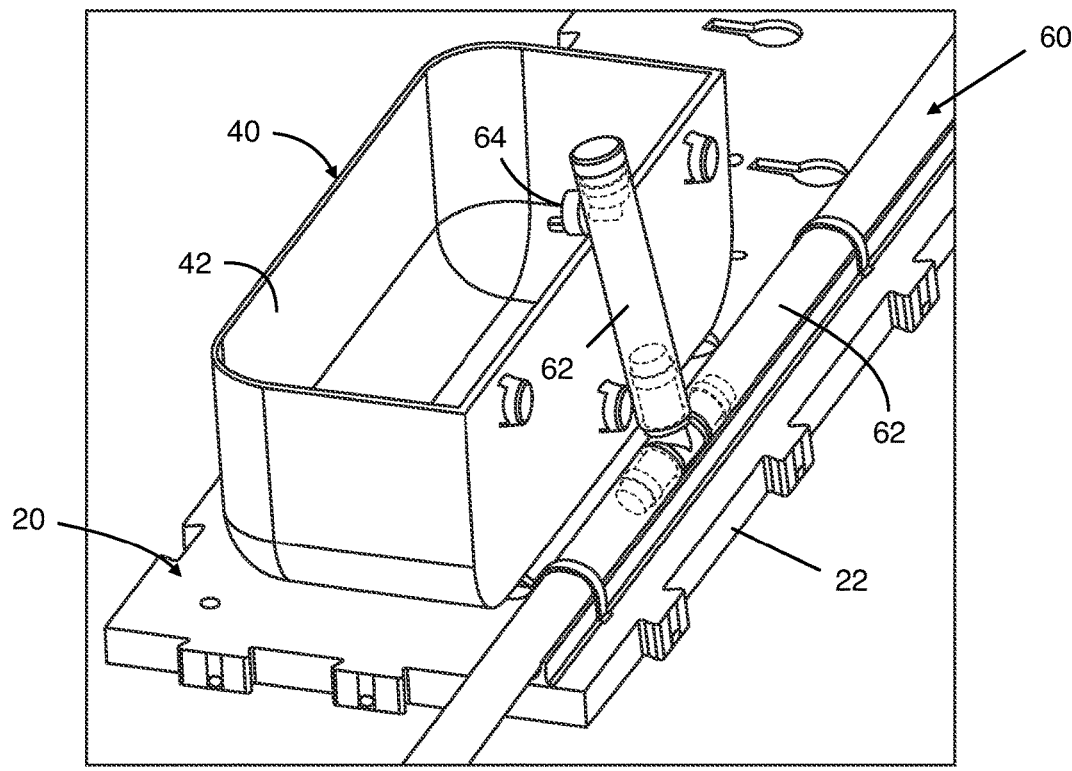
FIG. 19 represents an isometric view depicting irrigation assembly 60 mounted onto panel assembly 20 with container assembly 40 in an upright position in accordance with an embodiment of the present invention.

Irrigation assembly 60 includes irrigation tubing 62 that is disposed along the front side of panel 22. In the present embodiment, tubing 62 is operatively engaged with channel 25 as observed in FIGS. 18 and 19 of the provided drawings. Tubing 62 delivers irrigation water throughout the system to then be dispensed from a spout 64 into each container 42 along the modular panel system. FIG. 18 depicts tubing 62 positioned in accordance with the first configuration. In this configuration, container 42 is positioned directly below tubing 62 and spout 64 then delivers water into each container 42. FIG. 19 depicts tubing positioned in accordance with the second configuration. In this configuration, an external tubing member engages with cut section 44 in order to remain supported thereon. The top end of tubing 62 then includes spout 64 which delivers water into container 42.

Figure 20:
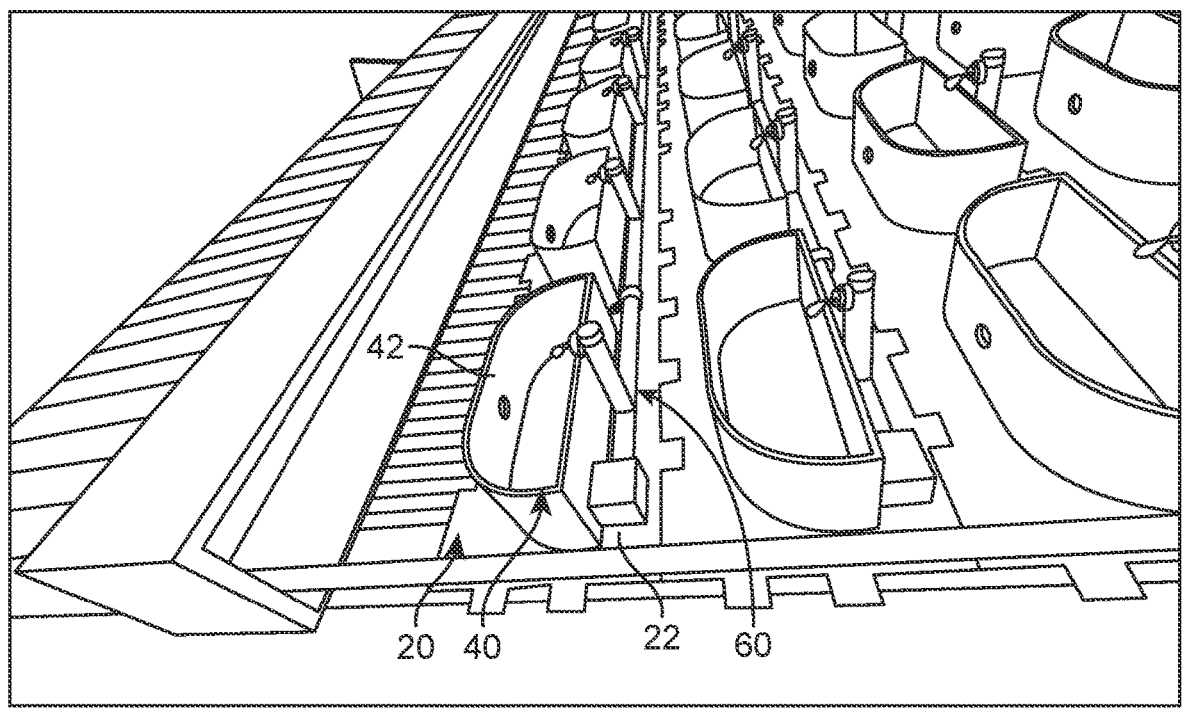
FIG. 20 shows an isometric view of paneling system for planters 10 in a roofing configuration in accordance with another embodiment of the present invention.

FIG. 20 depicts paneling system for planters 10 engaged in the second roofing configuration on an angled roof. It can be observed that a container may be positioned at the bottom of the paneling system in order to collect any runoff water that may then be distributed to the top of the roofing panels in order to be redistributed to the planters via the irrigation assembly. Additionally, the depicted embodiment features an opening disposed at the front end at each of the containers which aids in dispensing excess irrigation water from the container. The water then exits the container and is collected at the collection container positioned at the bottom of the panels.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A modular paneling system for planters, comprising:
   a) a panel assembly including at least one panel, wherein said at least one panel includes at least one through hole mount and at least one drainage opening adjacent to the through hole mount, said at least one through hole mount including a first section and a second section, wherein said first section is a circular open section, said second section is a rectangular open section, the at least one panel including a periphery having a crenellation pattern formed thereon, said crenellation pattern comprising of rectangular cut portions and rectangular protrusions, wherein the crenellation pattern of the at least one panel engages with the crenellation pattern located on a secondary panel, thereby securing the at least one panel to the secondary panel and defining a modular panel system; and
   b) a planter assembly including at least one container having a rear surface and a bottom surface each having at least one mounting member which operatively engages with said through hole mount, said bottom surface having at least one drainage hole that aligns with said drainage opening, wherein an equal amount and same configuration of mounting members are disposed on the rear surface of the at least one container as are disposed on the bottom surface of the at least one container, the at least one mounting member on either the rear surface or the bottom surface all align with their respective through hole mount of said at least one panel, the at least one drainage hole being located on the bottom surface.

2. The modular paneling system for planters of claim 1 wherein said at least one mounting member comprises a circular portion and a neck portion.

3. The modular paneling system for planters of claim 1 wherein said panel assembly includes an irrigation assembly comprising of tubing and spouts mounted thereon, wherein said tubing is operatively mounted onto a channel located on the at least one panel.

4. The modular paneling system for planters of claim 1 wherein said at least one container includes a cut section formed along an upper edge of said rear surface.

5. The modular paneling system for planters of claim 1 wherein said at least one panel further includes at least one mounting opening.

6. The modular paneling system for planters of claim 1 wherein said at least one panel is rectangular in shape and a perimeter is defined by four perimeter sides, wherein said crenellation pattern is lined along each of said four perimeter sides.

7. A modular system for planters, consisting of:
   a) a panel assembly including at least one panel having a perimeter, wherein said at least one panel includes a crenellation pattern formed about said perimeter, wherein said crenellation pattern comprises of a pattern of cut portions and protrusions, wherein the crenellation pattern of the at least one panel engages with a crenellation pattern located on a secondary panel, thereby securing the at least one panel to the secondary panel and defining a modular panel system, wherein said at least one panel further includes through hole mounts having a first section and a second section, wherein said at least one panel is rectangular in shape and said perimeter is defined by four perimeter sides, wherein said crenellation pattern is lined along each of said four perimeter sides;

b) a planter assembly including at least one container having a rear surface, a bottom surface, and an open top surface, the rear surface and the bottom surface each including rear mounting members and bottom mounting members respectively protruding therefrom; wherein in a vertical configuration, said rear mounting members traversing the through hole mounts via said first sections, said rear mounting members sliding from the first sections to said second sections; wherein in a horizontal configuration, said bottom mounting members traversing the through hole mounts via said first sections, said bottom mounting members sliding from the first sections to said second sections, and a drainage hole of the bottom surface aligning with a drainage opening of said panel while in the horizontal configuration; and c) an irrigation assembly including irrigation tubing mounted along said channel of the at least one panel, said irrigation tubing comprising spouts which are adapted to release water.

\* \* \* \* \*